J. M. EADIE.
BRAKE.
APPLICATION FILED OCT. 16, 1915.
1,279,745.
Patented Sept. 24, 1918.
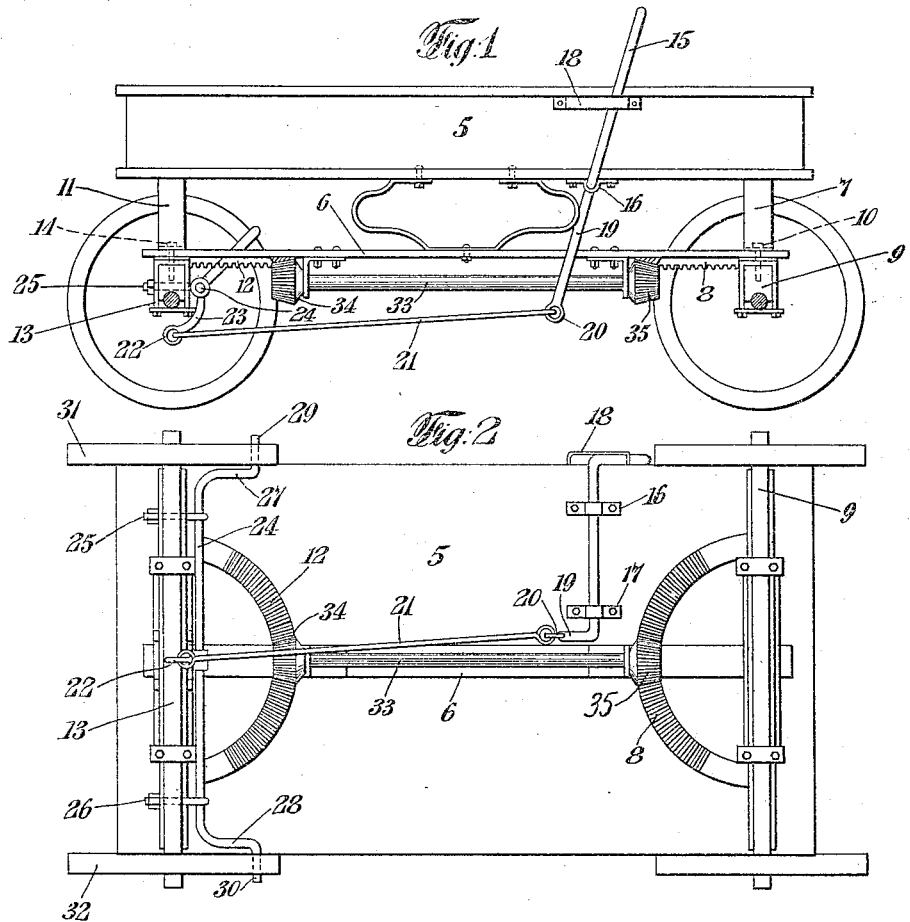
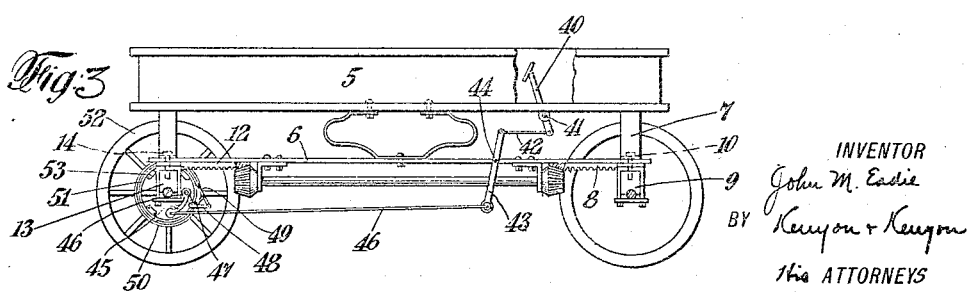
INVENTOR
John M. Eadie
BY Kenyon & Kenyon
his ATTORNEYS

UNITED STATES PATENT OFFICE.

JOHN M. EADIE, OF NEW YORK, N. Y.

BRAKE.

1,279,745.  Specification of Letters Patent.  Patented Sept. 24, 1918.

Application filed October 16, 1915. Serial No. 56,206.

*To all whom it may concern:*

Be it known that I, JOHN M. EADIE, a citizen of the Dominion of Canada, and a resident of the borough of Manhattan, city, county, and State of New York, have invented certain new and useful Improvements in Brakes, of which the following is a specification.

My invention relates to brakes for use on pivoted axles, and is particularly applicable to short-turn vehicles having two pivoted axles mechanically connected together so that when one turns in one direction the other is forced to turn simultaneously in the opposite direction.

It will be apparent from the fact that both axles of such vehicles swivel upon central points that the usual brake equipment mounted upon the frame of the vehicle is entirely impractical. The objects of my invention are, therefore, to provide a brake mechanism adapted for use on such running gear, which may be operated in the same manner that brakes are usually operated, and is cheap in construction and simple in application.

Further objects and advantages of my invention will more clearly appear from the following detailed description taken in connection with the annexed drawings, in which like reference characters indicate like parts.

Figure 1 is a side view of a vehicle equipped with a brake embodying one form of my invention.

Fig. 2 is a bottom view of the same.

Fig. 3 shows a modification in the application of the invention to a vehicle.

Referring to Figs. 1 and 2, the body portion 5 is mounted in any desirable manner upon the running gear, the latter being illustrated as consisting of the reach 6 attached to the front spring 7 and pivoted to the fifth wheel 8 and axle 9 by the king-bolt 10 and similarly attached at the rear end to the rear spring 11 and pivoted to the sixth wheel 12 and axle 13 by the king-bolt 14.

The short-turn device consists of the shaft 33 hung from reach 6 by suitable brackets and having pinions 34 and 35 at its ends to engage segmental racks on the lower faces of the fifth wheel 8 and sixth wheel 12, respectively.

It is to be understood that my invention is not limited to a gear of this type, nor to any gear of the two turning axle type, but may be used on any pivoted axle or on both axles of a short-turn gear.

The brake mechanism consists of the hand lever 15, pivoted in the two bearings 16 and 17, and limited in throw by the guard 18. Its lower crank arm 19 has a looped end 20, which engages one of the two looped ends of the rod 21, the other looped end being engaged with the loop 22 of the bent arm 23. This bent arm is rigidly connected to a shaft 24, which runs parallel to the axle 13 and is rotatably mounted thereon by the eye-bolts 25 and 26, and it has a double bend at both ends to form brake arms 27, 28, and brake shoes 29, 30, in proper position to bear upon the rims of the wheels 31 and 32. It will be apparent that, if the point of engagement of the rod 21 with the loop 22 be directly under the king-bolt 14, the swiveling of the axle 13 will not change the distance between that point of engagement and the looped end 20 of the crank arm 19, and that the brake may be effectively and evenly operated without regard to the position of the axles.

The use of looped connections at 20 and 22, while simple and efficient, is not necessary, as any other desirable form of pivot allowing sufficient universal motion may be employed.

In Fig. 3, I have shown the same type of mechanism modified for use with a foot pedal and brake band. The pedal 40 is pivoted to the vehicle body at 41 and linked by the rod 42 to the upper end of the lever 43. This lever is pivoted to the reach at 44 and connected to the bent arm 45 by the link 46, the connections at each end thereof being by interlocked loops, as in the case of the rod 21 (Fig. 1). The bent arm 45 corresponds to arm 23; shaft 46 rotated thereby corresponds to shaft 24; in this latter construction, however, the shaft 46 has its opposite ends bent in the form of bell crank levers 47 and connected by links 48 to the operating lever 49 of the external contracting brake band 50. A suitable brake drum 51 may be mounted on the wheel 52 by means of the lugs 53. It is obvious, of course, that the lever 43 may be dispensed with and pedal 40 connected directly to arm 45 by using at the same time an internal expanding type of brake band, or by changing the bell crank levers 47 into simple crank levers like the brake arms 27, 28, and connecting them with the type of brake band shown. Here, as in the first case, it is important that the point of engagement of bent arm 45 and link 46 be approximately under the pivot point of the axle.

While I have described my invention in great detail in what I consider to be its preferred embodiment, it will be apparent to those skilled in the art that numerous changes and substitutions of parts may be made without departing from the spirit of my invention, which I intend shall be limited and defined only by the scope of the appended claim.

Having thus described my invention, what I claim as new and desire to secure by Letters Patent, is:—

In apparatus of the character described, a vehicle body, an axle pivoted thereon, wheels on said axle, a brake shaft mounted on said axle for rotation, brake arms rigidly secured thereto for coöperation with said wheels, a substantially vertically extending crank arm rigidly secured to said shaft, a brake shaft on said body having a crank thereon, and a link connected to said last named crank, and to said first named crank at a point substantially in the pivotal axis of said axle.

In testimony whereof, I have signed my name to this specification.

JOHN M. EADIE.

Copies of this patent may be obtained for five cents each, by addressing the "Commissioner of Patents, Washington, D. C."